US012564857B2

(12) United States Patent
Stolt et al.

(10) Patent No.: US 12,564,857 B2
(45) Date of Patent: Mar. 3, 2026

(54) DISPENSER AND A CONTROL METHOD OF THE DISPENSER

(71) Applicant: Hilti Aktiengesellschaft, Schaan (LI)

(72) Inventors: Rocco Stolt, Niederraunau (DE); Michael Wiedemann, Koenigsbrunn (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 258 days.

(21) Appl. No.: 18/256,408

(22) PCT Filed: Nov. 16, 2021

(86) PCT No.: PCT/EP2021/081812
§ 371 (c)(1), (2) Date: Jun. 7, 2023

(87) PCT Pub. No.: WO2022/122315
PCT Pub. Date: Jun. 16, 2022

(65) Prior Publication Data
US 2024/0100560 A1 Mar. 28, 2024

(30) Foreign Application Priority Data
Dec. 10, 2020 (EP) .................................... 20212987

(51) Int. Cl.
*B05C 17/01* (2006.01)
*B05C 17/005* (2006.01)

(52) U.S. Cl.
CPC ...... *B05C 17/0103* (2013.01); *B05C 17/0052* (2013.01); *B05C 17/00583* (2013.01)

(58) Field of Classification Search
CPC .......... B05C 17/00583; B05C 17/0052; B05C 17/0103
See application file for complete search history.

(56) References Cited

U.S. PATENT DOCUMENTS 6,216,822 B1 4/2001 May et al.
6,854,349 B2 2/2005 Brandhorst et al.
(Continued)

FOREIGN PATENT DOCUMENTS

EP 2 314 384 4/2011
WO 2020/002596 1/2020

OTHER PUBLICATIONS

Office Action received in U.S. Appl. No. 18/256,385 mailed on Mar. 10, 2025, 10 pages.
(Continued)

*Primary Examiner* — Jeremy Carroll
(74) *Attorney, Agent, or Firm* — Grüneberg and Myers PLLC

(57) ABSTRACT

A dispenser for compound-containing containers includes a cassette for a container; at least one push rod displaceable relative to the cassette; a motor for moving the at least one push rod; a main switch for generating a control signal in response to actuation of the main switch; a control unit for controlling the motor; and a sensor configured to detect the moving of the push rod which is electronically connected to the control unit. The control unit is configured to store the dispensed volume of the compound and provide a feedback to the user once the dispensed volume of the compound reaches a defined value, and the user gets informed as soon as the cassette should be checked. Based on saved information of the dispensed volume of the compound, the user can be informed if a specified volume is reached and a check of the cassette is recommended.

16 Claims, 3 Drawing Sheets

(56) References Cited

U.S. PATENT DOCUMENTS

| | | | | | |
|---|---|---|---|---|---|
| 6,889,872 | B2 | | 5/2005 | Herman et al. | |
| 6,932,237 | B2 | | 8/2005 | Heymann et al. | |
| 7,116,071 | B2 | | 10/2006 | Glasgow et al. | |
| 8,684,229 | B2 | | 4/2014 | Harre et al. | |
| 9,359,122 | B2 | | 6/2016 | Schmid et al. | |
| 9,931,665 | B2 | | 4/2018 | Cheung et al. | |
| 10,265,721 | B2 | | 4/2019 | Beckett et al. | |
| 10,682,666 | B2 | | 6/2020 | Routen et al. | |
| 10,894,272 | B2 | | 1/2021 | Turner et al. | |
| 11,130,150 | B2 | | 9/2021 | Welch | |
| 11,458,503 | B2 | | 10/2022 | Kuhn et al. | |
| 11,465,170 | B2 | | 10/2022 | Turner et al. | |
| 11,673,160 | B2 | | 6/2023 | Kuhn et al. | |
| 2003/0080152 | A1 | * | 5/2003 | Balcome | B05C 17/00553 222/326 |
| 2005/0119604 | A1 | * | 6/2005 | Bonney | A61M 15/0083 604/19 |
| 2009/0101673 | A1 | | 4/2009 | Alioto et al. | |
| 2010/0163573 | A1 | | 7/2010 | Wegelin et al. | |
| 2011/0151042 | A1 | * | 6/2011 | Strobel-Schmidt | B29C 48/02 425/145 |
| 2013/0020350 | A1 | | 1/2013 | Gardos et al. | |
| 2015/0266050 | A1 | * | 9/2015 | Beckett | B05C 17/0103 222/310 |
| 2016/0169446 | A1 | * | 6/2016 | Peters | H04B 5/77 222/23 |
| 2017/0259485 | A1 | | 9/2017 | Strobel-Schmidt et al. | |
| 2020/0001320 | A1 | * | 1/2020 | Turner | A61C 9/0026 |
| 2022/0032337 | A1 | * | 2/2022 | Kuhn | B05C 17/00556 |
| 2022/0339590 | A1 | | 10/2022 | Turner et al. | |
| 2023/0158541 | A1 | | 5/2023 | Schäuble et al. | |

OTHER PUBLICATIONS

International Search Report issued Jan. 26, 2022, in PCT/EP2021/081812, 4 pages.

Written Opinion issued Jan. 26, 2022, in PCT/EP2021/081812, 5 pages.

Stolt et al., U.S. Appl. No. 18/256,594, filed Jun. 8, 2023.

Stolt et al., U.S. Appl. No. 18/256,344, filed Jun. 7, 2023.

Wiedemann et al., U.S. Appl. No. 18/256,385, filed Jun. 7, 2023.

U.S. Appl. No. 18/256,594, filed Jun. 8, 2023, Stolt et al.

U.S. Appl. No. 18/256,344, filed Jun. 7, 2023, Stolt et al.

U.S. Appl. No. 18/256,385, filed Jun. 7, 2023, Wiedemann et al.

* cited by examiner

DISPENSER AND A CONTROL METHOD OF THE DISPENSER

CROSS-REFERENCE TO RELATED APPLICATIONS

This application is the National Stage entry under § 371 of International Application No. PCT/EP2021/081812, filed on Nov. 16, 2021, and which claims the benefit of priority to European Application No. 20212987.0, filed on Dec. 10, 2020. The content of each of these applications is hereby incorporated by reference in its entirety.

BACKGROUND OF THE INVENTION

Technical Field

The present invention relates to a dispenser for compound-containing containers. The present invention also relates to a control method for use in such a dispenser.

Description of Related Art

A dispenser is used for dispensing compounds which are packaged in containers, such as mortar and sealing compounds, at a site of application. The containers include, for example, hard cartridges having one or more receiving chambers for one or more components of the compound to be dispensed which are provided directly or packaged, e.g. in foil packs, in the receiving chambers of the cartridge. The term “container” further includes foil packs which are filled with one or more compounds to be dispensed and which are inserted in a separate receiving body or in a receiving body mounted on the dispenser, since these foil packs have no side stability relative to their axial direction. The receiving body is so called a cassette or foil pack holder.

As the foil pack needs a cassette as a support while applying dispensing forces to the system. Due to dirt, wear or cured mortar, the cassette should be checked by the user regularly. Typically, the cassette or the foil pack holder should be checked every time before use, to ensure that the it is clean and the pistons move freely in the holder. If the pistons show higher friction in the cassette or the inner surface is contaminated, the cassette has to be replaced.

Currently the user checks the cassette after a certain numbers of dispensed foil packs, to ensure the security and correct function of the cassette. Since there is no counter available, the user can only note or estimate the numbers of dispensed foil packs.

SUMMARY OF THE INVENTION

It is an object of the present invention to provide a dispenser and an operating method for the dispenser will be able to provide an automated maintenance alert to the user as soon as the cassette shall be checked for wear, dirt or other contamination.

The present invention provides a method for operating a dispenser for compound-containing containers, comprising the following steps: triggering the main switch to activate the motor; a sensor detecting the movements of the push rod; a control unit storing the dispensed volume of the compound and providing a feedback to the user once the dispensed volume of the compound reaches a defined value.

With this preventive maintenance function, the user gets informed as soon as the dispensed volume has reached a defined volume, and then the cassette shall be checked. This is provided by the sensor detecting the position of the push rod and tracing its movements while operation. The control unit calculates a value representing the dispensed volume based on the movements of the push rod detected by the sensor. The defined volume is defined by the user in advanced in consideration of the requirement for maintaining the cassette.

Preferably, the dispensed volume of the compound is a value represented by summarizing the previously movements of the push rod. As the sensor is electronically connected to the control unit, then the sensor sends the data of previously movements of the push rod to the control unit. The control unit comprises a memory module configured to store the dispensed volume of the compound and a data process module configured to calculate if the dispensed volume of the compound reaches the defined value. Thus, the data process module transmits the change of the position of the push rod into the volume of the compound which has been already dispensed. Moreover, the memory module of control unit will store the value of the dispense volume of the compound.

Preferably, the defined value depends on the volume of different containers and the numbers of the dispensed containers as a limit for maintenance. For that automated maintenance alert, the user expects a certain number of dispensed containers as a limit for replacement of the cassette. Since the containers has different volumes, the certain volume of the limit for replacement will be different. This value will be determined based on the volume of the containers times the expected numbers of the dispensed containers where a maintenance of cassette shall be done.

The present invention provides a dispenser for compound-containing containers, comprising: a cassette for a container; at least one push rod displaceable relative to the cassette; a motor for moving the at least one push rod; a main switch for generating a control signal in response to actuation of the main switch; and a control unit for controlling the motor; a sensor configured to detect the moving of the push rod which is electronically connected to the control unit, and the control unit being configured to store the dispensed volume of the compound and provide a feedback to the user once the dispensed volume of the compound reaches to a defined value.

In an advantageous configuration of the dispenser according to the invention it is provided that the control unit comprises a memory module configured to store the dispensed volume of the compound and a data process module configured to calculate if the dispensed volume of the compound reach the defined value. Thus, the data process module transmits the change of the position of the push rod into the volume of the compound which has been already dispensed. Moreover, the memory module of control unit will store the value of the dispense volume of the compound.

In another advantageous configuration of the dispenser according to the invention it is provided that the dispenser comprises an indicator which is electrically connected to the control unit and generates a user-perceivable signal when the dispensed volume of the compound reaches a defined value. This allows the user to fulfil his responsibility to check the cassette or decide if the cassette has to be replaced. Advantageously, the user-perceivable signal is an audible signal and/or a visible signal. Alternatively, the dispenser has a connection to a smart device or a cloud. The connection could be, for example, a Bluetooth, NFC, etc. The smart device installs a software or an application to process the information and generate a signal to inform the user to change the cassette.

In another advantageous configuration of the dispenser according to the invention it is provided that the dispenser comprises a receiver configured to read the information of the container's volume and a data process module configure to determine the defined value based on the information. The receiver of the dispenser will identify the volume of different foil packs, then the control unit will automatically calculate the defined value of the limit for maintenance.

Preferably, the container is a foil pack, as the foil pack needs a cassette as a support while applying dispensing forces to the compound in the container.

BRIEF DESCRIPTION OF THE DRAWINGS

Further features and advantages of the invention are described in greater detail hereinafter by means of an embodiment by way of example with reference to the drawings. In the Figures.

DETAILED DESCRIPTION

Figure 1:
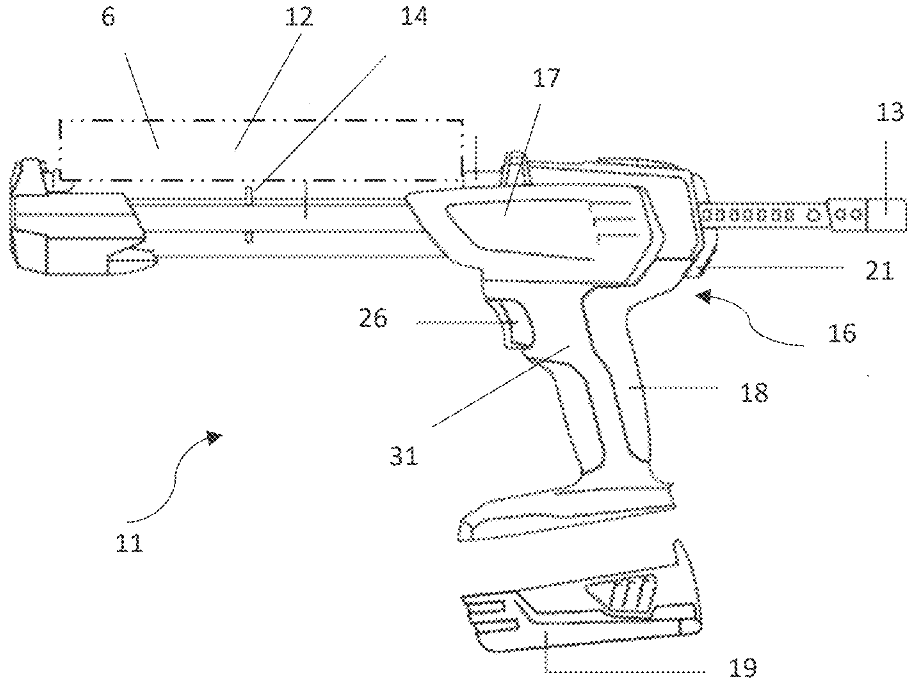
FIG. 1 is a top, front perspective view of an embodiment of a dispenser.

Dispenser 11 for compound-containing containers 6, as shown in FIG. 1, has a receiving chamber 12 for container 6, a push rod 13 which is displaceable relative to receiving chamber 12, and an electrically operable extrusion mechanism. A pressure piston 14 for applying pressure to container 6 and/or to the compound contained therein is provided on the end of push rod 13 facing receiving chamber 12. Operation of dispensing mechanism 16 causes push rod 13 to move into receiving chamber 12, thereby pressurizing the compound contained in container 6, causing it to be extruded through outlet of container 6. The compound contained in container 6 includes one or several components. According to a preferred embodiment of the invention, the compound contained in container 6 includes two compounds, thereby two push rods being displaceable relative to the receiving chamber 12. A mixer (not shown) is advantageously provided at outlet of the container 6, said mixer ensuring complete mixing of the components prior to being discharged through the outlet.

Dispenser 11 for compound-containing containers 6, as shown in FIG. 1, has a cassette 12 for supporting the container 6, a push rod 13 which is displaceable relative to cassette 12, and an electrically operable dispensing mechanism. A pressure piston 14 for applying pressure to container 6 and/or to the compound contained therein is provided on the end of push rod 13 facing the cassette 12. Operation of dispensing mechanism 16 causes push rod 13 to move into the cassette 12, thereby pressurizing the compound contained in container 6, causing it to be extruded through outlet of container 6. The compound contained in container 6 includes one or several components. According to a preferred embodiment of the invention, the compound contained in container 6 includes two compounds, thereby two push rods being displaceable relative to the cassette 12. A mixer (not shown) is advantageously provided at outlet of container 6, said mixer ensuring complete mixing of the components prior to being discharged through the outlet.

Dispensing mechanism 16 is accommodated in a housing 17 having a handle 18 extending therefrom. A power supply 19 in the form of a battery pack is detachably connected to the free end of handle 18. Dispensing mechanism 16 includes a motor 21 which, via a transmission mechanism, drives a drive wheel (not shown) meshing with teeth on push rod 13, thereby moving the push rod 13.

Handle 18 is further provided with a main switch 26 in the form of a push button for generating a control signal in response to actuation of main switch 26. Also provided is a control unit 31 for controlling motor 21, said control unit having a power module for connecting the motor 21 to power supply 19. The main switch 26 is electrically connected to control unit 31.

Figure 2:
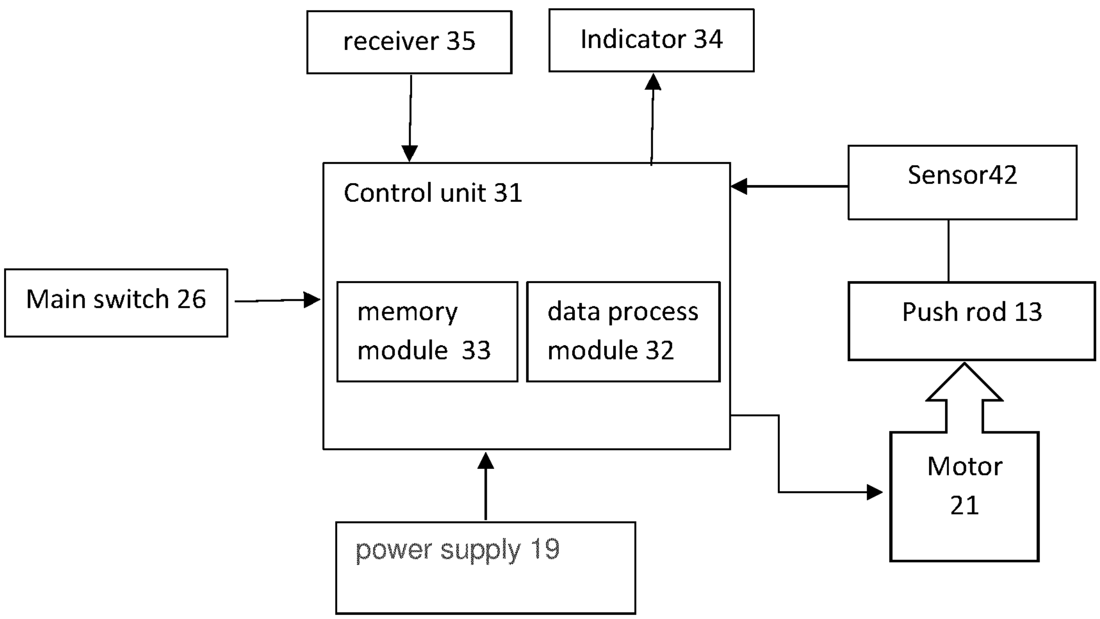
FIG. 2 is a schematic diagram of the dispenser of FIG. 1 including a control unit.

As shown schematically in FIG. 2, the dispenser further comprises a sensor 42 for detecting the movements of the at least one push rod 13. The control unit 31 comprises a data process module 32 and a memory module 33. The sensor 42 is electronically connected to the control unit 31. Said push rod 13 is configured to link to the sensor 42. The sensor 42 detects the movements of the push rod 13, therefore the dispensed amount of the compound is a value represented by summarizing the previously movements of the push rod 13. The sensor 42 sends the signal of the movements of the push rod 13, then the data process module 32 of the control unit will calculate the amount of the compound which has been already dispensed based on the summary of the previous movements of the push rod 13 and store the data in the memory module 33.

Preferably, the container 6 is a foil pack. It is well known that the container includes hard cartridges and foil packs. Hard cartridges do not require a cassette while foil packs need a cassette 12 as support. The cassette 12, should be checked every time before use, to ensure that it is clean, and the pistons 14 move freely in the holder. If the pistons 14 show higher friction in the cassette 12 or the inner surface is contaminated, the cassette 12 has to be replaced.

Figure 3:
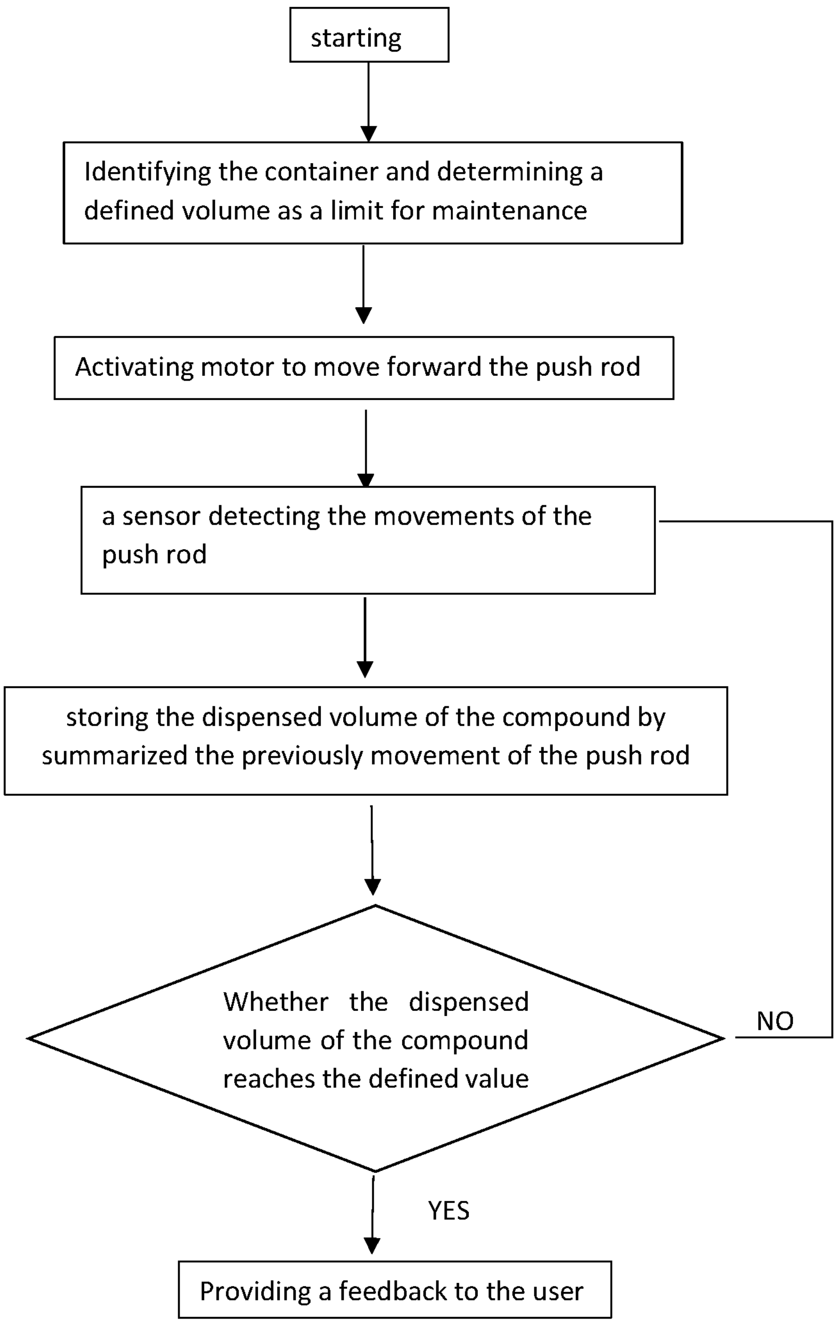
FIG. 3 illustrates the flow chart of the operating method of the dispenser of FIG. 1.

Referring to FIG. 3, according to the invention the method for operating a dispenser for compound-containing containers, comprises the following steps: triggering the main switch to activate the motor; a sensor detecting the movements of the push rod; a control unit storing the dispensed volume of the compound and providing a feedback to the user once the dispensed volume of the compound reaches a defined value.

According to one preferred embodiment of the invention, the dispensed volume of the compound is a value representing the previously movements of the push rod. The defined value depends on the volume of different containers and the numbers of the dispensed containers as a limit for maintenance. For that automated maintenance alert, it is expected that approximate 200 dispensed foil packs/cartridges as a number limit for replacement of the cassette 12. The foil packs in the market have different volumes, such as 330 ml, or 500 ml. The certain volume of the limit for replacement will be different. This defined value will be determined based on the volume of the containers. In an exemplary embodiment, the foil pack's volume is 500 ml, and as the expected number of dispensed foil pack for the maintenance is 200, then the certain volume for the automated maintenance alert would be 100 L. Once the control unit calculates the dispensed volume of the foil packs reaching to 100 l, based on the data of paths of the push rod detected by the sensor 42, the expected number for maintenance alert is reached, then the user will be informed to check the cassette 12 and decide if the cassette shall be replaced or not. The maintenance alert is more a support to remind the user to check and replace the cassette. Maintenance here means to check and replace if required. Cleaning can be an option, but in most cases, it is not possible and will not lead to sufficient results.

Preferably, the dispenser comprises an indicator 34 which is electrically connected to the control unit 31 and generates a user-perceivable signal when the dispensed volume of the compound reaches a defined value. This allows the user to fulfil his responsibility to check the cassette or decide if the cassette has to be replaced. Advantageously, the user-perceivable signal is an audible signal and/or a visual signal. For example, a LED will be lighted up as an indicator of maintenance alert. Alternatively, a smart device (not shown) or a cloud connects to dispenser. The information of dispensed volume could also be stored in the tool electronics. Having a connection to smart devices (e.g. Bluetooth, NFC, etc.) or to a cloud this information could be processed in e.g. Hilti Connect App or other applications to inform the user to change the cassette.

In another preferred embodiment of the invention, the dispenser 11 further comprises a receiver 35 which can read the information of the container's volume and the data process module 33 determines the defined value based on the information. The receiver 35, for example, may be a device which can scan a radio frequency tag or a data matrix code. When the receiver 35 read the RF tag or data matrix code, the data process module 32 transmits the information to a defined value of the limit for maintenance alert.

Using the dispenser according to the present invention is in a convenient manner to remind the use to check the cassette for the containers if there is wear, dirt or other contaminations, to ensure the security and correct function of the cassette.

While only selected embodiments have been chosen to illustrate the present invention, it will be apparent to those skilled in the art from this disclosure that various changes and modifications can be made herein without departing from the scope of the invention. Thus, the foregoing descriptions of the embodiments according to the present invention are provided for illustration only, and not for the purpose of limiting the invention.

The invention claimed is:

1. A method for operating a dispenser for a compound-containing container, the method comprising:

providing a dispenser body defining a housing for a motor, a main switch, a control unit comprising a processor and a memory module, a sensor, an indicator, and at least one push rod;

providing a replaceable cassette removably attachable to the dispenser body, the replaceable cassette being configured to receive a compound-containing container during dispensing;

supporting the at least one push rod by the dispenser body and mechanically coupling the at least one push rod to the motor for displacement relative to the compound-containing container to dispense compound therefrom;

actuating the motor with the main switch electrically connected to the control unit;

detecting, with the sensor electronically connected to the control unit, movement of the at least one push rod and generating a movement signal indicative of displacement of the at least one push rod;

processing, with the processor of the control unit executing instructions stored in the memory module, the movement signal to determine the displacement of the at least one push rod;

calculating, with the processor, a cumulative dispensed volume of compound from a plurality of disposable compound-containing containers received in the replaceable cassette;

storing the cumulative dispensed volume in the memory module, retrieving the cumulative dispensed volume from the memory module, and comparing the cumulative dispensed volume to a predefined threshold corresponding to a replacement condition of the replaceable cassette; and when the predefined threshold is reached, transmitting an alert signal from the control unit to the indicator to provide a user feedback signal to replace the replaceable cassette.

2. The method according to claim 1, wherein calculating the cumulative dispensed volume comprises using movement data comprising cumulative displacement of the at least one push rod during dispensing from the plurality of disposable compound-containing containers.

3. The method according to claim 1, further comprising determining, with the processor, the predefined threshold based on a volume of one of the plurality of disposable compound-containing containers and a number of dispensed containers representing a replacement condition of the replaceable cassette.

4. The method according to claim 1, further comprising reading, with a receiver, volume information from the plurality of disposable compound-containing containers, and determining, with the processor, the predefined threshold based on the information read by the receiver.

5. The method according to claim 3, further comprising connecting a smart device and/or a cloud server to the control unit and generating, with the smart device or the cloud server, a signal to inform a user to replace the replaceable cassette when the cumulative dispensed volume of the compound reaches the predefined threshold based on dispensing from the plurality of disposable compound-containing containers.

6. A dispenser for a compound-containing container, comprising:

a dispenser body defining a housing for at least a motor, a main switch, a control unit, a sensor, an indicator, and at least one push rod;

a replaceable cassette removably attachable to the dispenser body and configured to receive a compound-containing container during dispensing;

the at least one push rod supported by the dispenser body and mechanically coupled to the motor for displacement relative to the compound-containing container to dispense the compound therefrom;

the motor disposed within the dispenser body and operatively coupled to the at least one push rod;

the main switch mounted to the dispenser body and electrically connected to the control unit for actuating the motor;

the control unit disposed within the dispenser body and comprising a processor and a memory module, the control unit operatively connected to the motor to drive the motor based on actuation of the main switch;

the sensor configured to detect movement of the at least one push rod and electronically connected to the control unit and configured to generate a movement signal indicative of the displacement of the at least one push rod;

the indicator mounted to the dispenser body and electrically connected to the control unit, the indicator being configured to receive an alert signal from the control unit;

wherein the processor of the control unit is configured to execute instructions stored in the memory module to receive the movement signal from the sensor, process the movement signal to determine the displacement of the at least one push rod, calculate a cumulative dispensed volume of compound from a plurality of disposable compound-containing containers received in the cassette, store the cumulative dispensed volume in the memory module, retrieve the cumulative dispensed volume from the memory module for comparison to a predefined threshold corresponding to a replacement condition of the cassette, and, when the predefined threshold is reached, transmit the alert signal to the indicator to provide a user feedback signal to replace the cassette.

7. The dispenser according to claim 6, wherein the cumulative dispensed volume is based on movement data comprising cumulative displacement of the at least one push rod based on use of the plurality of disposable compound-containing containers.

8. The dispenser according to claim 6, wherein the memory module is configured to store the calculated dispensed volume of the compound, and the processor is configured to determine whether the dispensed volume has reached the predefined threshold based on use of the plurality of disposable compound-containing containers.

9. The dispenser according to claim 6, wherein the indicator electrically connected to the control unit generates a user-perceivable signal when the dispensed volume of the compound reaches the predefined threshold based on use of the plurality of disposable compound-containing containers.

10. The dispenser according to claim 6, further comprising a smart device and/or a cloud server configured to connect to the control unit and generate a signal to inform the user to change the cassette when the dispensed volume of the compound reaches the predefined threshold based on use of the plurality of disposable compound-containing containers.

11. The dispenser according to claim 6, further comprising a receiver configured to read volume information from the plurality of disposable compound-containing containers, and wherein the processor is configured to determine the predefined threshold based on the information read by the receiver.

12. The dispenser according to claim 6, wherein the plurality of disposable compound-containing containers are foil packs.

13. The dispenser according to claim 6, wherein the control unit is configured to determine the predefined threshold based on a volume of one of the plurality of disposable compound-containing containers and a number of dispensed containers representing a replacement condition of the replaceable cassette.

14. The method according to claim 1, further comprising storing, in the memory module of the control unit, the calculated dispensed volume of the compound, and determining, with the processor of the control unit, whether the dispensed volume has reached the predefined threshold based on use of the plurality of disposable compound-containing containers.

15. The method according to claim 1, further comprising generating, with the indicator electrically connected to the control unit, a user-perceivable signal when the cumulative dispensed volume of the compound reaches the predefined threshold based on dispensing from the plurality of disposable compound-containing containers.

16. The method according to claim 1, wherein the plurality of disposable compound-containing containers received in the replaceable cassette are foil packs.

* * * * *